US012511430B2

(12) United States Patent
Fanning et al.

(10) Patent No.: US 12,511,430 B2
(45) Date of Patent: Dec. 30, 2025

(54) AUTOMATED REMEDIATION OF EXPOSED SECRETS

(71) Applicant: Microsoft Technology Licensing, LLC, Redmond, WA (US)

(72) Inventors: Michael Christopher Fanning, Redmond, WA (US); Nicolas Yves Couraud, Westwood, MA (US); Jacek Andrzej Czerwonka, Sammamish, WA (US); Christopher Michael Henry Faucon, Redmond, WA (US); Yingting Yu, Sydney (AU); Etan Micah Basseri, Seattle, WA (US); Floyd Odiwuor K'otohoyoh, Nairobi (KE); Jacek Ernest Lichwa, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 403 days.

(21) Appl. No.: 17/967,124

(22) Filed: Oct. 17, 2022

(65) Prior Publication Data

US 2024/0126917 A1 Apr. 18, 2024

(51) Int. Cl.
*G06F 21/62* (2013.01)
*G06F 21/57* (2013.01)
*G06F 21/64* (2013.01)

(52) U.S. Cl.
CPC ........ *G06F 21/6245* (2013.01); *G06F 21/577* (2013.01); *G06F 21/64* (2013.01); *G06F 2221/2143* (2013.01)

(58) Field of Classification Search
CPC .... G06F 21/6245; G06F 21/577; G06F 21/64; G06F 2221/2143; G06F 21/45

USPC .......................................................... 726/26
See application file for complete search history.

(56) References Cited

U.S. PATENT DOCUMENTS

| 8,881,249 B2 | 11/2014 | Brady et al. |
| 9,465,942 B1 * | 10/2016 | Kane-Parry ........... G06F 21/125 |
| 10,614,208 B1 | 4/2020 | Edwards et al. |
| 10,924,464 B2 | 2/2021 | Huynh |

(Continued)

OTHER PUBLICATIONS

"Email Postmark Validation Algorithm", Retrieved From: http://download.microsoft.com/download/5/d/d/5dd33fdf-91f5-496d-9884-0a0b0ee698bb/%5BMS-OXPSVAL%5D.pdf, Jun. 13, 2016, 21 Pages.

(Continued)

*Primary Examiner* — Amare F Tabor
(74) *Attorney, Agent, or Firm* — Workman Nydegger

(57) ABSTRACT

Techniques for identifying an exposed credential that, if used, would provide access to a resource are disclosed. The techniques enable the resource to remain online while (i) a new credential is allocated for the resource, (ii) the resource is transitioned to using the new credential instead of the exposed credential, and (iii) the exposed credential is attempted to be invalidated. A credential is accessed. This credential is suspected of being in an exposed state. The credential is accessible from within an artifact and is determined to be in the exposed state. A new credential is generated. This new credential is designed to replace the exposed credential. An instruction is transmitted to the resource to cause it to transition from using the exposed credential to using the new credential. The exposed credential is then invalidated.

20 Claims, 10 Drawing Sheets

(56) References Cited

U.S. PATENT DOCUMENTS

| | | | |
|---|---|---|---|
| 11,283,832 B2 | 3/2022 | Endler | |
| 11,314,861 B2* | 4/2022 | Sun | G06F 21/556 |
| 11,328,053 B2* | 5/2022 | Bengtson | H04L 63/0823 |
| 11,334,661 B1 | 5/2022 | Brandwine et al. | |
| 11,363,039 B2* | 6/2022 | Kaidi | G06F 21/60 |
| 11,665,151 B2* | 5/2023 | Baumgarte | H04L 63/0807 |
| | | | 713/168 |
| 2004/0034771 A1* | 2/2004 | Edgett | H04L 63/0846 |
| | | | 713/153 |
| 2020/0137096 A1* | 4/2020 | Endler | H04L 63/083 |
| 2022/0327541 A1* | 10/2022 | Seguritan | G06Q 20/4016 |
| 2023/0078044 A1* | 3/2023 | Robbins | H04L 63/10 |
| | | | 726/23 |
| 2024/0012623 A1* | 1/2024 | Ben Salem | G06F 8/30 |
| 2024/0143785 A1* | 5/2024 | Perry | G06Q 40/08 |
| 2024/0356984 A1* | 10/2024 | Gamra | H04L 63/1425 |

OTHER PUBLICATIONS

"Hashcash", Retrieved From: http://www.hashcash.org/, Retrieved On: May 1, 2022, 1 Page.

"SafeID Credential Monitoring", Retrieved From: https://www.identityautomation.com/iam-platform/rapididentityidentity-access-management/safeid-credential-monitoring/, Retrieved Date: Aug. 8, 2022, 9 Pages.

Fanning, Michael C., "Update Key Generation to Provide Fixed Signatures and Encoded Checksums (for Improved Security Tooling)", Retrieved From: https://github.com/Azure/azure-functions-host/pull/7663, Sep. 11, 2021, 3 Pages.

Harvey, Heather, "Behind Github's New Authentication Token Formats", Retrieved From: https://github.blog/2021-04-05-behind-githubs-new-authentication-token-formats/, Apr. 5, 2021, 9 Pages.

Pascu, Luana, "How to Decrease False Positives When Scanning for Committed Secrets", Retrieved From: https://flare.systems/learn/resources/blog/how-to-decrease-false-positives-when-scanning-for-committed-secrets/, Nov. 25, 2020, 7 Pages.

Toomey, Patrick, "Behind the Scenes of Github Token Scanning", Retrieved From: https://github.blog/2018-10-17-behind-the-scenes-of-github-token-scanning/, Oct. 17, 2018, 7 Pages.

Feng, et al., "Automated Detection of Password Leakage from Public GitHub Repositories", In 44th International Conference on Software Engineering (ICSE '22), Pittsburgh, PA, USA, May 21, 2022, pp. 175-186.

International Search Report and Written Opinion received for PCT Application No. PCT/US2023/031804, mailed on Dec. 7, 2023, 13 Pages.

International Preliminary Report on Patentability received for PCT Application No. PCT/US2023/031804, May 1, 2025, 6 pages.

\* cited by examiner

AUTOMATED REMEDIATION OF EXPOSED SECRETS

BACKGROUND

Plaintext secrets (e.g., unencrypted secrets) present a serious source of security risk for the data storage industry. Indeed, many plaintext secrets are actually overlooked by scan tools. In cases where exposed secrets are detected, there are significant complications in remediating these exposures. Such complications include scenarios where supposed secrets end up being false positives. Another complication involves detecting secrets that are expired or that belong to deleted resources. If a secret is expired or belongs to deleted resources, then remediation is not needed, and if performed, is a wasted effort. Another complication is that it may be difficult to determine what entity allocated the secret so that the entity can be contacted to provide a security response. It may also be difficult to determine the full set of actors who use a specific secret and who will therefore be disrupted if a secret is invalidated or rotated without coordinating with them.

"Bearer token" systems are a particular source of risk. A "bearer token" is a type of plaintext secret that is a quasi-password. This quasi-password, on its own, can be used to complete an authentication flow (e.g., "please provide access to the bearer of this secret"). Bearer tokens are performant and are broadly used throughout the industry. Because there is no identity-specific validation (e.g., no expensive cryptographic signing), this security model can be very convenient. The storage, retrieval, and transmission of these types of secrets, however, should still be handled in a secure way.

There is a trend in the industry to move away from bearer tokens in favor of exclusively identity-driven solutions, such as role-based access control (RBAC) and managed service identities (MSI). These approaches sidestep many risks associated with bearer tokens but can come at greater costs, both in terms of creating and managing identities and in converting existing systems to move off the bearer token approach.

That being said, some data storage customers have expressed an unwillingness to move away from bearer tokens, even in cases when RBAC/MSI-driven alternatives exist to provide authentication. This unwillingness is often due to the lack of convenience with such systems and due to presumed development inefficiencies.

Unfortunately, developers sometimes inadvertently expose secrets/credentials. In fact, it is inevitable that some secrets/credentials (e.g., bearer tokens, passwords, usernames, etc.) will be committed to source code, a document, or some other data structure (collectively referred to as "artifacts"). That artifact might then be egressed to a public repository or other Internet location, thereby providing a risk for a security breach in which an unauthorized entity gains access to the secret and then uses that secret to gain access to a resource.

Exposed secrets/credentials have been a challenge for data storage providers for a very long time. For instance, thousands of valid application secrets are found in commonly used repositories each month (e.g., more than 500 occurrences each month). Sometimes, customers are not aware of this exposure. When a secret is found, it is often the case that customers fail to remediate correctly. That is, despite humans being involved in the remediation process, those humans can actually introduce additional error into the process, resulting in even more problems. What is needed, therefore, is an improved technique for remediating circumstances in which a credential has been exposed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed here relate to systems, devices, and methods for identifying an exposed credential that, if used, would provide access to a resource. The embodiments further enable the resource to remain online while (i) a new credential is allocated for the resource, (ii) the resource is transitioned to using the new credential instead of the exposed credential, and (iii) the exposed credential is attempted to be invalidated.

Some embodiments scan a data source (e.g., a persistent artifact store or a persistent data store) that includes an artifact. The embodiments then identify, within the artifact, a credential. Additionally, or alternatively, some embodiments access the credential.

This credential is suspected of being in an exposed state. If this credential were used, it would provide access to a resource. Notably, the credential is accessible from within an artifact. Based on an identified characteristic associated with the credential, the embodiments determine that the credential is in the exposed state and thus has been exposed. The resource is identified, and this resource is associated with the exposed credential. The embodiments generate a new credential designed to replace the exposed credential. The embodiments transmit an instruction to the resource instructing the resource to transition from using the exposed credential to using the new credential. The embodiments attempt to cause the exposed credential to be invalidated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
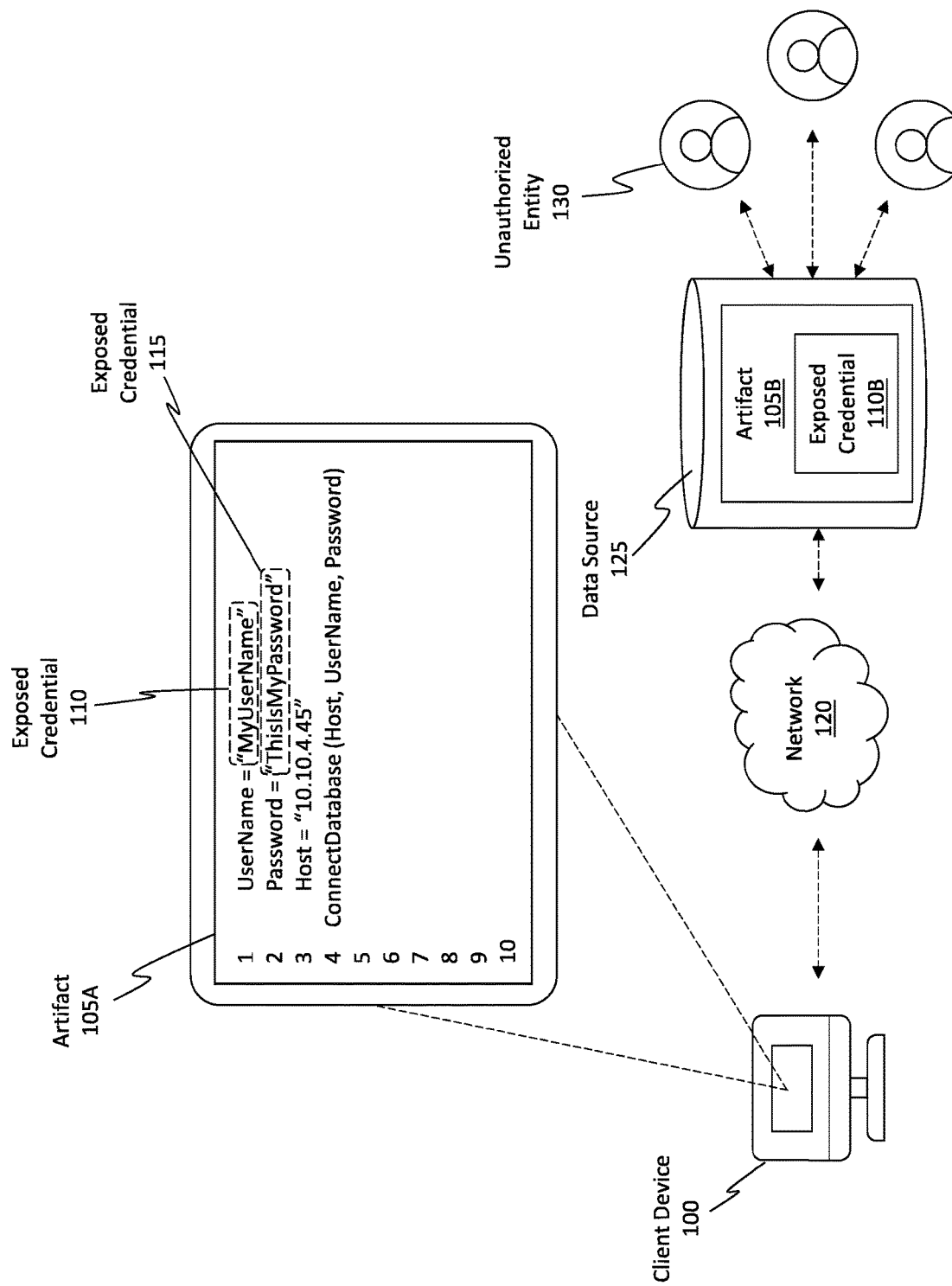
FIG. 1 illustrates an example scenario where a credential has been leaked to a publicly accessible data source.

Embodiments disclosed here relate to techniques for identifying an exposed credential that, if used, would provide access to a resource. The embodiments further enable the resource to remain online while (i) a new credential is allocated for the resource, (ii) the resource is transitioned to using the new credential instead of the exposed credential, and (iii) the exposed credential is attempted to be invalidated.

Some embodiments access a credential. This credential is suspected of being in an exposed state. The credential is accessible from within an artifact. The credential is determined to be in the exposed state. A resource that is associated with the credential is identified. The embodiments generate a new credential designed to replace the exposed credential. The embodiments transmit an instruction to the resource to cause it to transition from using the exposed credential to using the new credential. The embodiments also attempt to cause the exposed credential to be invalidated.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Historically, the process of remediating a situation involving a leaked secret (aka credential) typically required about 6 different human steps and involved 2-3 different human users. Historically, the time needed to perform the remediation also took on average about 7 days. Interestingly, human error also played a significant role in the remediation process. For instance, studies have shown that during the remediation process, humans had an error rate of about 20% in how they dealt with the leaked credential.

The disclosed embodiments bring about substantial benefits, advantages, and practical applications to the technical field of data security management. Beneficially, the disclosed embodiments have entirely removed the role of humans in the remediation process. As a result, the number of human steps that are needed to remediate a situation involving a leaked credential is now 0, and the number of humans that need to be involved is also 0. As another benefit, the amount of time needed to perform the remediation is reduced from 7+ days (historically) to now about 5 minutes. Inasmuch as the disclosed embodiments remove the human aspect from the remediation process, one can also appreciate how the human error rate during the remediation process is now reduced to 0%. As compared to the historical trends or averages, the disclosed embodiments provide profound benefits to the technical field.

The disclosed embodiments also help prevent possible security breaches by automating the remediation of exposed secrets, whether they are client secrets, application secrets, or perhaps even developer secrets. The embodiments effectively create an automation routine that allows a workload identity to "self-heal" when it detects a leaked credential. That is, with regard to the general process flow, the disclosed service attempts to remove or eliminate the need for human involvement. In doing so, the service significantly reduces error rates that humans introduce into the remediation process. The service also significantly decreases the amount of time that is needed to remedy the mistake or leakage.

As further benefits, the disclosed embodiments detect the exposure of credentials and remediate the problem by invalidating/renewing the token with no human interaction. Because the disclosed operations can be performed very quickly, the embodiments greatly reduce the potential for security breaches.

The embodiments beneficially describe a solution that addresses all of the concerns and complications mentioned earlier. At a high-level the disclosed principles include techniques for improving the "identifiability" of credentials (e.g., bearer tokens, passwords, usernames, etc.) to drive false positive and false negative rates in detection to 0%. The embodiments also provide an automated rotation mechanism for invalidating and replacing credentials used by a resource. The embodiments also provide an anonymous endpoint that accepts reports of exposure. The disclosed embodiments include a service that can correlate secrets with the resource providers that allocated them.

There are many substantive values in such a system. For instance, the system holds the promise of remediating security risks with no human involvement. Doing so would greatly reduce the literal costs associated with routing and remediating these finds today and would reduce the window of literal exposure for an exposed secret. This embodiments allow for seamlessly merging of a bearer token model or credential model with an RBAC or MSI-driven approach. In other words, bearer tokens can be allocated and utilized by development teams (e.g., to gain the convenience and efficiencies of this approach) with the advance knowledge that any detection/reporting of these secrets (if they are mishandled) will result in the automatic invalidation of those secrets.

The embodiments also allow for maximal engagement with the security researcher community. Reporting can be entirely anonymous as the simple fact of having/bearing a secret is sufficient to require invalidating that secret. "Identifiable" secrets (e.g., secrets having a known pattern) also eliminate false negatives and false positives, which ensures that all activity in the system is driven by actual finds.

The disclosed identifiable secrets model additionally allows for routing and risk assessment (using the bearer tokens themselves). Such a model allows for a single reporting endpoint to handle credentials reported for a range of resource providers (e.g., secret allocating security models). As a result, the disclosed solutions eliminate false positives and ensure that no false negatives (missed detections) occur. Such solutions provide an enormous improvement over many existing scan capabilities today.

The disclosed solutions do not necessitate the management of enormous amounts of metadata to determine the resource provider who allocated the secret, the persons who allocated the secret, or even all users/dependencies that also depend on the secret. The solutions allow for complete anonymity in reporting, thereby allowing the system to leverage (as one example) public security research and reporting to the endpoints (e.g., for secrets that may be detected in public open source repositories).

The disclosed solutions maximally decrease the latency of remediation, thereby allowing for the fastest security response entailing fewest costs. The disclosed solutions allow teams to leverage the convenience of the bearer token model or to maintain this model for backwards compatibility reasons while affording a fundamental increase in the security of these systems. Accordingly, these and numerous other benefits will now be described in detail throughout the remaining sections of this disclosure.

Example Scenario Involving an Exposed Credential

Having just described a few of the benefits of the disclosed embodiments, attention will now be directed to FIG. 1. FIG. 1 illustrates an example scenario involving the use of a client device 100. In this example, the client device 100 belongs to a code developer who is developing source code, which is a type of engineering artifact, or simply artifact 105A.

Figure 2:
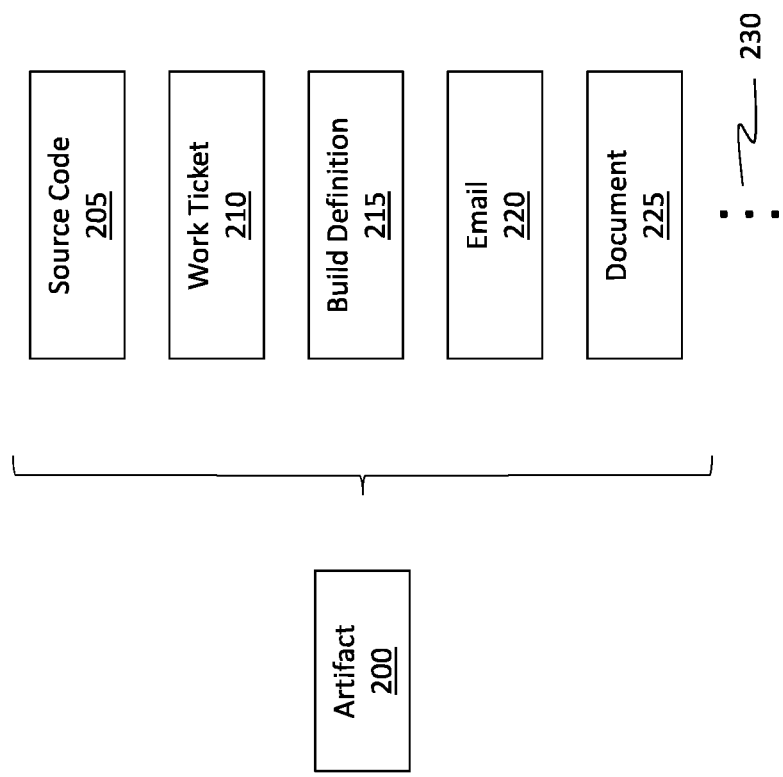
FIG. 2 illustrates various implementations of an artifact.

Turning briefly to FIG. 2, this figure illustrates various other examples of an artifact 200, which is representative of the artifact 105A from FIG. 1. Artifact 200 can take various forms. These forms include, but are not limited to, any type of source code 205, work ticket 210, build definition 215, email 220, or even a document 225. The ellipsis 230 illustrates how other data structures can be included in the artifact 200. For instance, the data structures can include other data structures associated with the build definition, such as perhaps an automation artifact comprising (i) an automation script, descriptor, or other artifact that configures or otherwise drives automation behavior and (ii) an automation output comprising a log or compilation output. The data structures can also include a workflow artifact. The data structures can include any type of source controlled artifact, which can include the source code 205 or any other artifact that is included in a data source.

Figure 3:
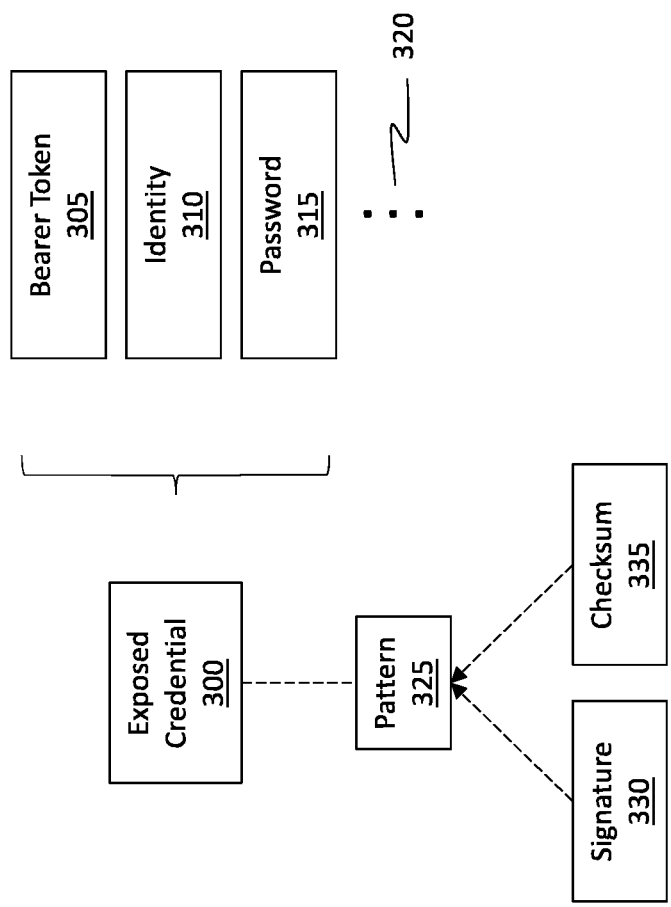
FIG. 3 illustrates various examples of an exposed credential.

Returning to FIG. 1, the artifact 105A is shown as being in the form of source code. Embedded within this source code are at least two exposed credentials, as shown by exposed credential 110 and exposed credential 115. The exposed credential 110 (aka secret) is shown as being a username, and the exposed credential 115 is shown as being a password. FIG. 3 provides some additional details regarding various different types of exposed credentials.

FIG. 3 shows an exposed credential 300, which is representative of any of the exposed credentials in FIG. 1. In various embodiments, the exposed credential 300 can be in the form of a bearer token 305, an identity 310 (e.g., a username, a GUID, a sensitive identifier signifier, or some other name), or a password 315. The ellipsis 320 demonstrates how other data structures can be designated as an exposed credential 300. For instance, the exposed credential can be a certificate (e.g., an allocated bundle of data that is allocated by an authority), a private key (e.g., a mathematically static value used for cryptographic purposes), a static credential store (e.g., a bundle of credentials that are persisted to file, such as perhaps an archived copy of passwords or perhaps a checked-in set of credentials), a container of multiple artifacts, or even compressed data. As some additional examples, it may be the case that a computer port is an exposed credential, an Internet Protocol (IP) address is an exposed credential, any type of token can be an exposed credential, and so on.

In some implementations, the embodiments are able to recognize a data structure as being a credential based on a detected pattern 325 of that data structure. For instance, the embodiments are able to cause a credential to include an embedded signature 330. Some credentials can include an embedded or associated checksum 335. The embodiments are able to scan and analyze a data source, which potentially includes a credential, to detect the credential based on its pattern. If the pattern matches a known pattern that is linked or associated with patterns that are known to belong to credentials, then the embodiments can determine that this data structure is a credential. Accordingly, the pattern can optionally be based on one or a combination of the signature 330 and/or the checksum 335. In some implementations, a credential can take a variety of forms. For instance, the credential can be formatted as a 256-bit base64-encoded string.

Regarding the signature 330, a fixed signature, sometimes referred to as a "magic value" can be used. This fixed signature can be a constant numeric or textual value that is persisted to a well-known position within a data stream to denote its format. This mechanism can be used to efficiently eliminate a significant percentage of false positives via regex matching. Such a practice is beneficial because constant values can be expressed in the token/credential itself. If thoughtfully designed, this process can allow for 100% recall (i.e. 100% true positive retrieval) via simple (regex) pattern-matching. This avoids the costs of performing additional runtime processing.

Regarding the checksum 335, checksums provide a well-known pattern for ensuring data integrity. Secret providers can reserve bytes within a secret to store a computed checksum of the remaining data. Beneficially, individual security providers can uniquely identify their own secrets (e.g., within an otherwise shared format) by XOR'ing checksums with a well-known, stable "magic value." Because checksums are distributed across their full range of values (that is, a 32-bit checksum will distribute all possible inputs across $2^{32}$ possible checksums), this greatly reduces the likelihood of a collision with a different data generator.

In some embodiments, there are 8-10 characters reserved in every generated secret, token, or credential. These characters are reserved to express a fixed signature and a checksum (or partial checksum). Optionally, the secret reserves the final 4-6 characters of the token to persist an encoded checksum of the remainder of the secret. The checksum, when generated, can include the fixed signature in its processing.

Optionally, every resource provider can be tasked with defining a unique checksum seed that appropriately categorizes generated secrets. Generated keys that are provided to customers, for example, can use a different checksum seed than a code path that generates keys for encrypting customer data (which are entirely managed by the resource provider). For base64-encoded secrets, the checksum can be persisted in the final bytes of the decoded secrets. For secrets that are allocated from a custom character set, the checksum can be encoded using that character set and appended to the remainder of the secret.

Distinct seeds/secret categories can be versioned simply by incrementing the first allocated seed value (or by incrementing a numeric value in a string literal used to generate the seed). The secret can include a four-character fixed signature that is persisted immediately before the checksum.

In addition to or as an alternative to the signature and checksum, other techniques can be used to provide a detectable pattern for a credential. For instance, a "hashcash" can be used. A hashcash is a proof-of-work algorithm that entails completing sufficient computation to generate data that, when hashed, conforms to a highly recognizable pattern (e.g., such as by having a certain number of leading zeros). The technique works by first generating a secret that meets a length or other criteria. Arbitrary data is then appended to the secret until the hash of the candidate data has a recognizable signature (e.g., such as three leading zeros in the hash value). Once the right additional data (e.g., a "nonce") is found, all of it (e.g., the original secret plus the nonce that together results in a recognizable signature when hashed) is returned and serves as the secret. This technique provides for easily identified secrets/passwords. A scanner can perform a preliminary detection and can then hash all finds to look for the identifiable pattern in the hash. Detections that do not meet the hash pattern criteria are dropped as false positives. Accordingly, there are various techniques for configuring a secret to have a known pattern.

Returning to FIG. 1, the user of the client device is currently developing source code. In this example, the user has decided to check his/her code into a data source for safe keeping or perhaps for peer review. FIG. 1 shows the scenario where the client device 100 is connected to a network 120 and where the artifact 105B, which is representative of the artifact 105A, is shown as being uploaded or checked into a data source 125. Notice, the artifact 105B is shown as including the exposed credential 110B, which is representative of one of the exposed credentials 110 or 115.

In this scenario, the data source 125 is a publicly accessible data source. Notice, an unauthorized entity 130 is shown as now having access to the exposed credential 110B. If this exposed credential 110B were accessed by the unauthorized entity 130, that entity could then potentially use the credential to access a resource that the entity would not otherwise be permitted to access. A "resource" can be any type of resource. Examples of resources include, but are not limited to, an application, service, executable, or any other type of data structure that uses or relies on credential information.

Accordingly, FIG. 1 shows an example scenario that could potentially lead to a security breach. The disclosed embodiments are beneficially tailored to remediate such a scenario and to prevent the potential for security breaches.

Example Architectures

Figure 4A:
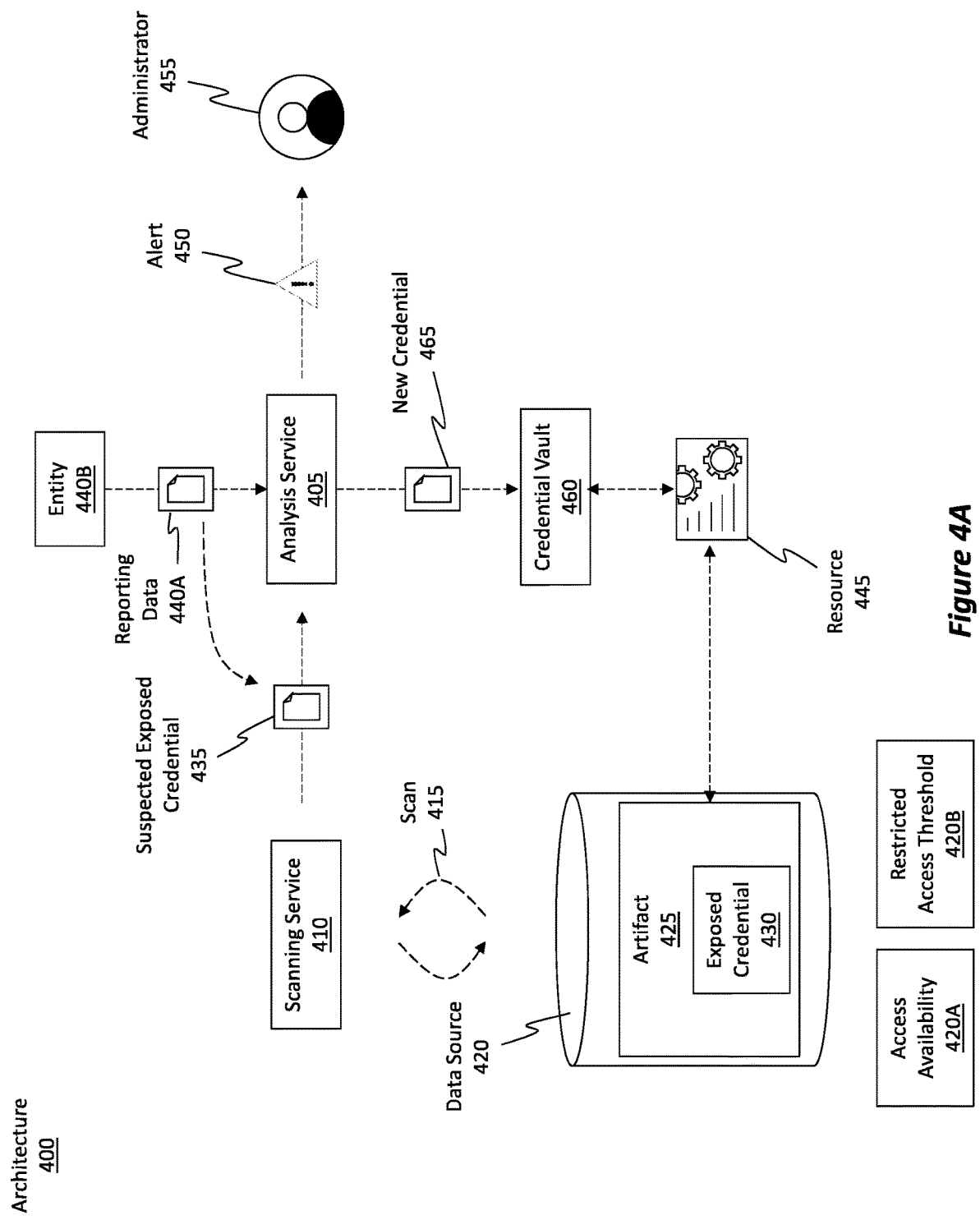
FIGS. 4A, 4B, 4C, 4D, and 4E illustrate various example architectures that can be used to automatically remediate the effects of a credential being exposed.

Attention will now be directed to FIG. 4A, which illustrates an example architecture 400 that can be used to remediate situations where a credential has been exposed and could lead to a security breach. Architecture 400 is shown as including an analysis service 405.

In various embodiments, the analysis service 405 is a cloud service operating in a cloud environment. In other embodiments, the analysis service 405 is a local service that is operating on a local device. In yet other embodiments, the analysis service 405 is a hybrid service that can operate in both the cloud and on a local device.

In some cases, the analysis service 405 is or includes a machine learning engine. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The analysis service 405 operates in conjunction with a scanning service 410. In some implementations, the scanning service 410 is an integrated part of the analysis service 405. In other implementations, the scanning service 410 is distinct relative to the analysis service 405. Optionally, the scanning service 410 can even be a third-party service.

In any event, the scanning service 410 is tasked with scanning (e.g., as shown by scan 415) a data source 420. The data source 420 can be any type of data source. In some instances, the data source is a controlled data source that restricts access to only authorized individuals having a threshold level of security authorization. In some implementations, the data source 420 is a publicly accessible data source that has no or minimum security requirements to access the data source 420. In some cases, the data source 420 is controlled by an enterprise, yet it is still generally accessible by entities associated with the enterprise. In any event, the data source 420 is one whose access availability 420A (e.g., options that enable entities to access the data source 420) does not satisfy a restricted access threshold 420B with regard to the credential and/or resource. What this generally means is that the content uploaded or checked into the data source should be (but sometimes is not) content that would not present a possibility for a potential security breach. As mentioned previously, however, that is not always the case. Stated differently, it may be the case that confidential credential information has been inadvertently uploaded into the data source 420, and entities who do not have sufficient authorization to access a resource can otherwise access it because they can now access that resource's credential via the data source 420.

In FIG. 4A, an artifact 425 (e.g., any of the artifacts 200 of FIG. 2) has been uploaded or checked into the data source 420. In this example, the artifact 425 is shown as comprising an exposed credential 430, similar to the scenario that was described in FIG. 1.

In accordance with the disclosed principles, the embodiments are able to scan the data source 420 and detect the exposed credential 430. Machine learning can be performed to detect the credential 430. In some cases, the credential 430 can be detected based on its detected pattern, as mentioned previously.

The analysis service 405 obtains or accesses the now-suspected possibly-exposed credential 435, which is representative of the exposed credential 430. Optionally, instead of obtaining the actual credential, the analysis service 405 obtains information describing the credential. Such information can include the specific location where the exposed credential 430 is located, such as its memory position or perhaps its location within the artifact 425.

In some implementations, additional or alternative reporting data 440A can be provided to the analysis service 405. For instance, a separate entity 440B (e.g., perhaps external third-party services) or perhaps even humans can detect the presence of an exposed credential in a data source. The separate entity 440B can be an anonymous endpoint, a trusted entity, or even an internal enterprise entity. These entities can report their findings in the form of the reporting data 440A and can provide that reporting data 440A to the analysis service 405. Thus, in some scenarios, the scanning service 410 detects the presence of the exposed credential 430 and provides it to the analysis service 405 while in other scenarios, the exposed credential 430 is detected by some other entity and reported to the analysis service 405 in the form of reporting data 440A. As such, the exposed credential 430 can be reported even by anonymous entities. Receipt of the reporting data 440A can trigger the embodiments to perform a verification on the reporting data 440A in an attempt to reduce or eliminate a false positive with regard to identifying an exposed credential. In some instances, receiving the reporting data 440A can trigger the scanning service 410 to scan and analyze whatever data source is identified by the reporting data 440A in an attempt not only to identify a potential exposed credential (as identified in the reporting data 440A) but also to potentially identify other potentially exposed credentials in the data source. Receiving the reporting data 440A can thus trigger the identification of the suspected exposed credential 435, which might be identified via other techniques beyond that of the scanning service 410 (e.g., it might be identified via the reporting data 440A).

In response to accessing the reporting data, the embodiments can perform one or more various actions. For instance, the embodiments can filter the reporting data to determine an accuracy associated with the reporting data (e.g., does the reporting data accurately identify an exposed credential or an artifact comprising the exposed credential). In other words, the embodiments can perform an evaluation on the data in an attempt to filter out false positives. Another action includes acquiring one or more artifacts pointed to by the reporting data and subjecting those artifacts for review or scan. In some cases, an artifact comprising the potentially exposed credential can be accessed, downloaded, or otherwise contacted. The embodiments can then trigger an examination of this artifact in an attempt to verify the authenticity of the reporting data.

In some implementations, the analysis service 405 reviews the exposed credential to confirm that it actually is a credential that could be used to access a resource. Such a process can be performed in multiple different ways.

For instance, the analysis service 405 can determine or identify a specific resource 445 that is associated with the exposed credential 430. In some implementations, this identification process can be performed by analyzing text, metadata, or any other parameters included in the artifact 425. For instance, if the artifact 425 is source code, that source code can be analyzed to determine the identity of the resource 445.

The analysis service 405 can query the resource 445 to ask the resource 445 if the credential could be used to gain access to the resource 445. The resource 445 may then provide a response based on the query, and the response could be yes or no. In another scenario, the analysis service 405 may actually attempt to use the exposed credential 430 to access the resource 445. If the attempt is successful, then the analysis service 405 will know that the credential is valid.

In yet another scenario, the analysis service 405 may query a security service model that is associated with the resource 445. For instance, suppose the resource 445 is a SQL database. The SQL database may be managed by a SQL server or service. The analysis service 405 can query this SQL service to determine whether the exposed credential 430 could be used to access the SQL database.

If the analysis service 405 discovers that the exposed credential 430 is representative of a credential but it cannot be used to access any resources, then the analysis service 405 may determine that no harm will come from the exposed credential 430 being left in the data source 420. In such a scenario, the analysis service 405 can either perform no remediation or, alternatively, the analysis service 405 can optionally trigger an alert 450 to an administrator 455 associated with the artifact 425 to inform the administrator 455 that poor coding practices have been followed, but no remediation will be performed. In addition to or instead of an administrator, an entity having permissions to manage the resource or artifact can be notified.

In an alternative scenario, the analysis service 405 may determine that the exposed credential 430, if used, would provide access to the resource 445 and that potential harm could come from the exposed credential 430 being left in the data source 420. In such a scenario, the analysis service 405 can (in one embodiment) communicate with a credential vault 460 that manages credentials for the resource 445. The analysis service 405 can trigger the generation of a new credential 465 for use by the resource 445 and for confidential storage in the credential vault 460.

Regarding the credential vault 460, this vault can optionally be a type of secret manager that operates in conjunction with the disclosed identity-driven authentication mechanisms. Using this vault, any credentials that are used can be strictly transmitted across secure protocols such as HTTPS. The credential vault 460 is often different from a resource redeployment manager or service that generates credentials (often it is the security service model). The credential vault 460 stores the credentials, but it is typically the case that it does not create the credentials. In some embodiments, the service that creates the new credential can create it to have functional features or characteristics similar to that of the exposed credential. For instance, if the exposed credential had time use limitations or frequency of use limitations or perhaps read-only limitations, the service can tailor the new credential to also have similar functionality. In a specific use case scenario, suppose the exposed credential had a lifespan that was due to expire within the next 5 minutes. Optionally, the service can create a new credential that has a longer lifespan in order to enable the responsible entity to be adequately informed regarding the redeployment to the new credential.

Accordingly, in some cases, a security model allocates a new credential and then triggers redeployment. The model can also inject the credential into another entity that manages the credential/secret, such as the credential vault 460. As a result, the security model is distinct from the credential vault 460. During rotation of the exposed credential with the new credential, the embodiments can communicate with the token provider (e.g., perhaps the security model). When looking to apply the new credential, however, the embodiments can take that newly allocated credential and put in the credential vault 460 to drive updating of any services that might rely on it or on the resource that relies on it.

Figure 4B:
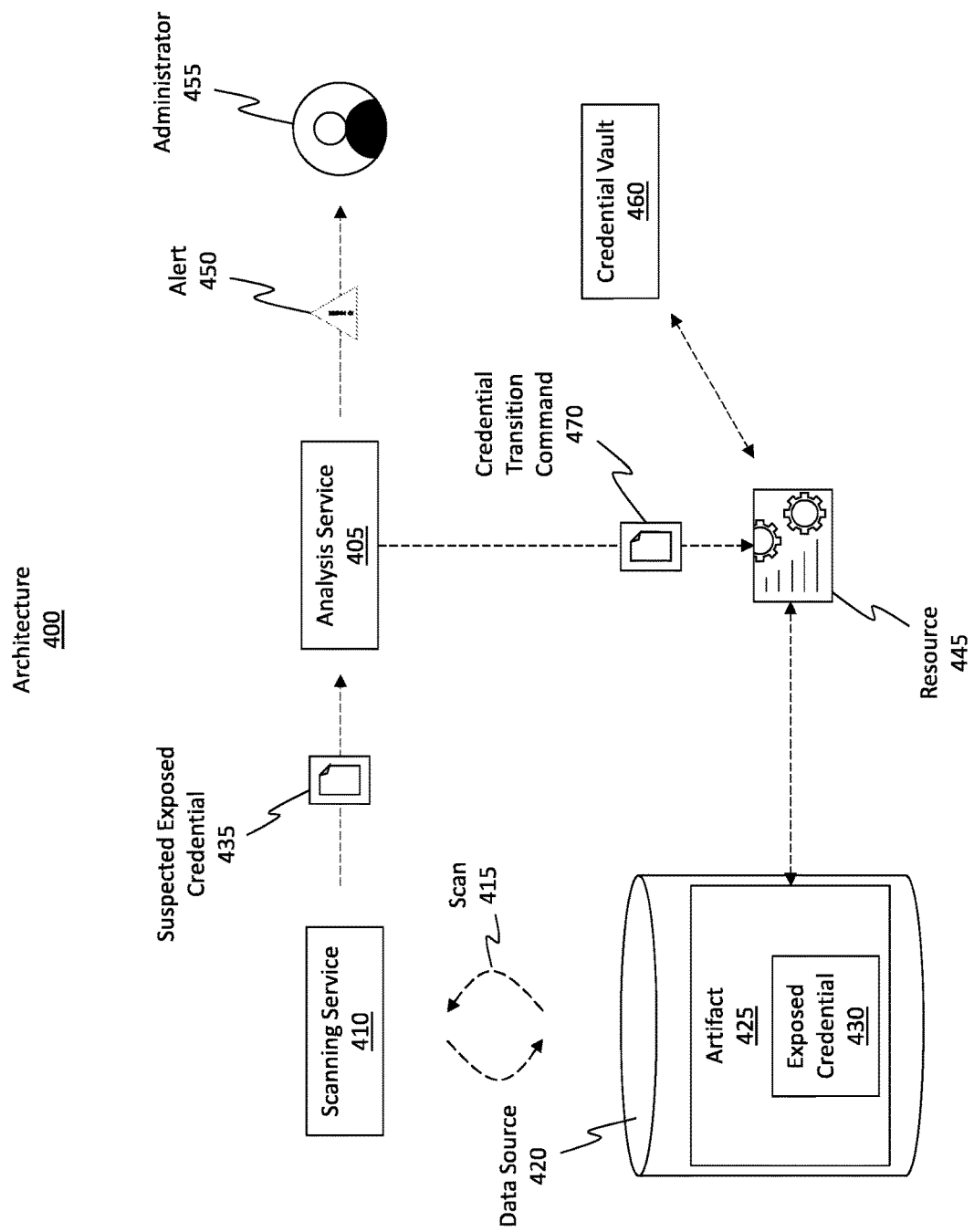

As shown in FIG. 4B, the analysis service 405, transmits an instruction (e.g., credential transition command 470) to the resource 445 instructing the resource 445 to transition from using the exposed credential 430 to using the new credential 465. In some cases, the above action is performed while the embodiments monitor the resource 445 to ensure the resource remains online. Stated differently, the analysis service 405 monitors the resource 445 to ensure that it remains online. If the resource 445 terminates or is no longer online, the analysis service 405 can trigger a series of alerts to administrators to try to bring the resource 445 back online. The analysis service 405 can also try to reinstate the resource 445. At this point in time, it may be the case that both the exposed credential 430 and the new credential 465 can be used to access the resource 445.

Figure 4C:
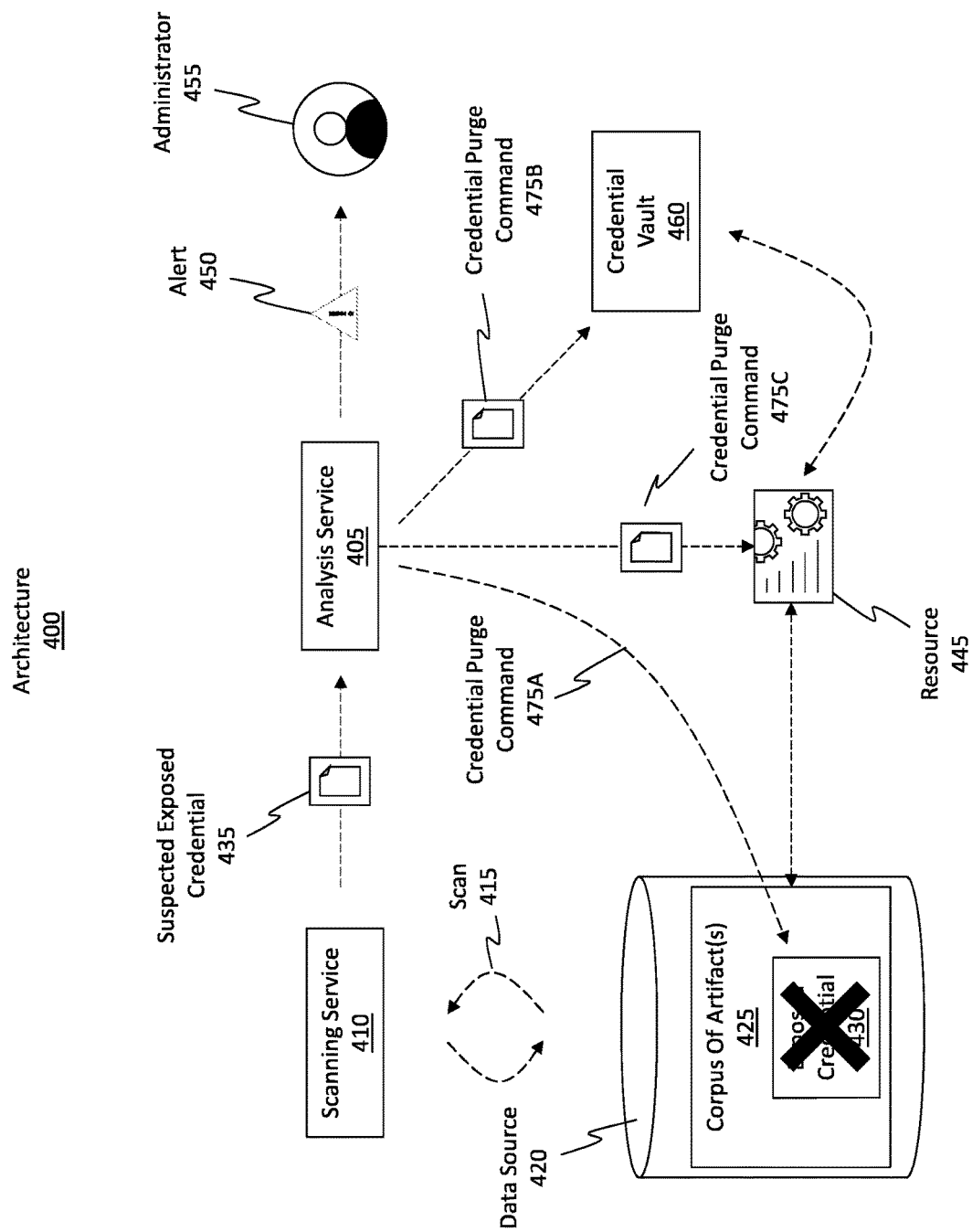

FIG. 4C shows an additional command that is executed after the credential transition command 470. The analysis service 405 can optionally continue to monitor that the resource 445 remains online. Additionally, the analysis service 405 attempts to cause the exposed credential 430 to be invalidated. Invalidating the exposed credential 430 can include purging (e.g., deleting) the exposed credential 430 from at least one of the data source 420, the resource 445, or the credential vault 460. In this manner, the embodiments facilitate a soft swap or a soft transition from using an exposed credential to using a new credential.

FIG. 4C shows various credential purge commands. For instance, the analysis service 405 issues a credential purge command 475A to the data source 420 to cause the data source 420 to purge the exposed credential 430. Similarly, the analysis service 405 issues a credential purge command 475B to the credential vault 460 to purge the exposed credential from the credential vault 460. Stated differently, in some embodiments, a credential vault is provided. The credential vault maintains credentials for the resource, including the exposed credential and the new credential. The exposed credential can be purged from the credential vault.

To complete the example, the analysis service 405 also issues a credential purge command 475C to the resource 445 to purge the exposed credential from the resource 445.

The resource 445 then transitions from using the exposed credential to using the new credential. Optionally, a redeployment of the resource 445 can occur to trigger the resource 445 to use the new credential.

Figure 4D:
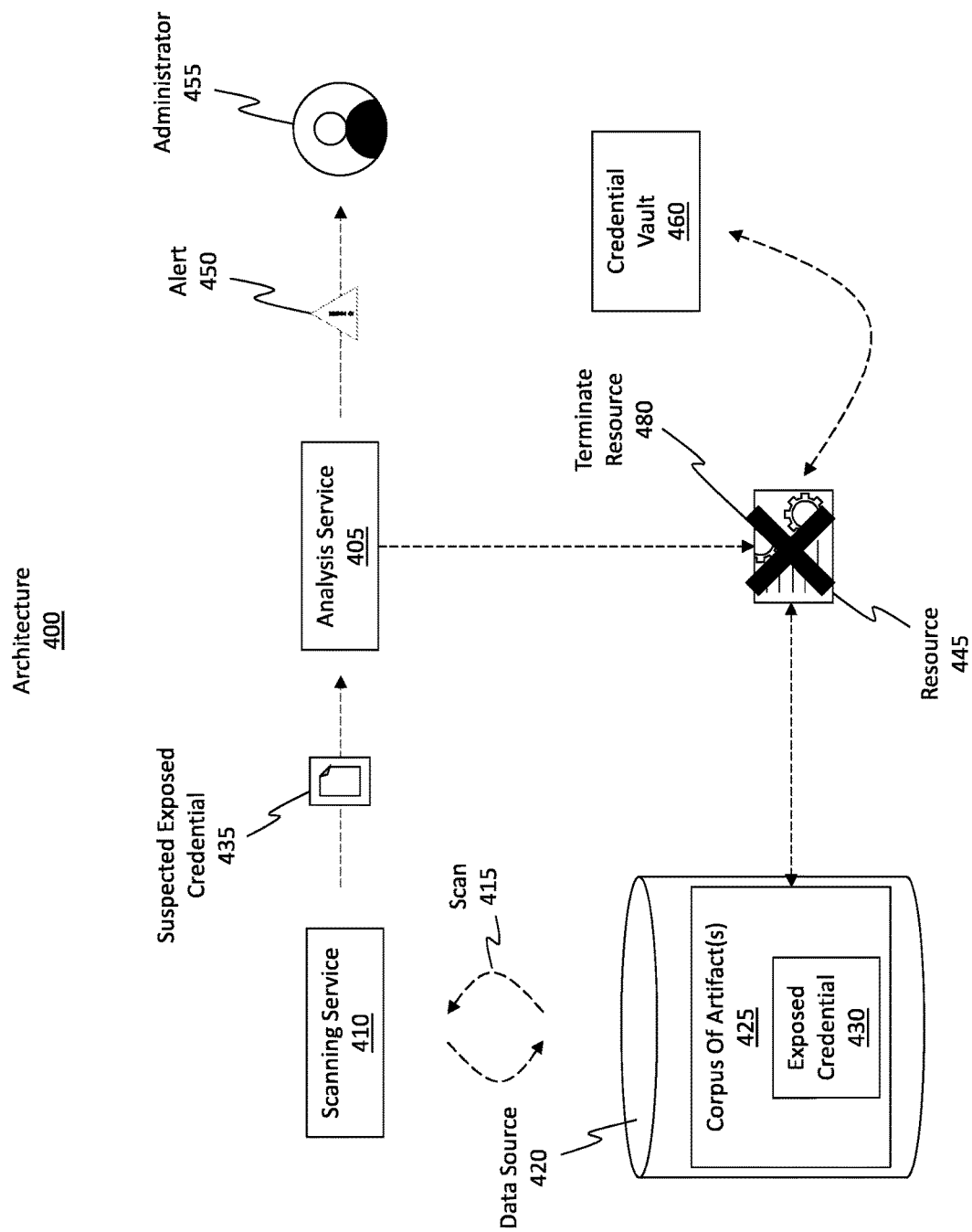

In some rare implementations, it may be the case that the exposed credential 430 cannot be purged without breaking, killing, or terminating the resource. Such situations can occur, as an example, when the credential is hardcoded into source code and the credential vault 460 was not used to manage the credentials. In such a scenario, FIG. 4D shows how the analysis service 405 can terminate the resource 445, as shown by terminate resource 480. It may be the case that the analysis service 405 will prevent the resource 445 from restarting until such time as an administrator for the resource removes dependency on the exposed credential 430. Such an action can be used to help promote good coding practices.

It should be noted that throughout any of the disclosed actions, the embodiments can trigger the generation of one or more alerts, as shown by alert 450, to the administrator 455. Notably, the disclosed actions can occur automatically and without input from the administrator 455. Stated differently, the disclosed operations can include transmitting an alert to an administrator, and the operations can be performed automatically, even without a response from the administrator.

Figure 4E:
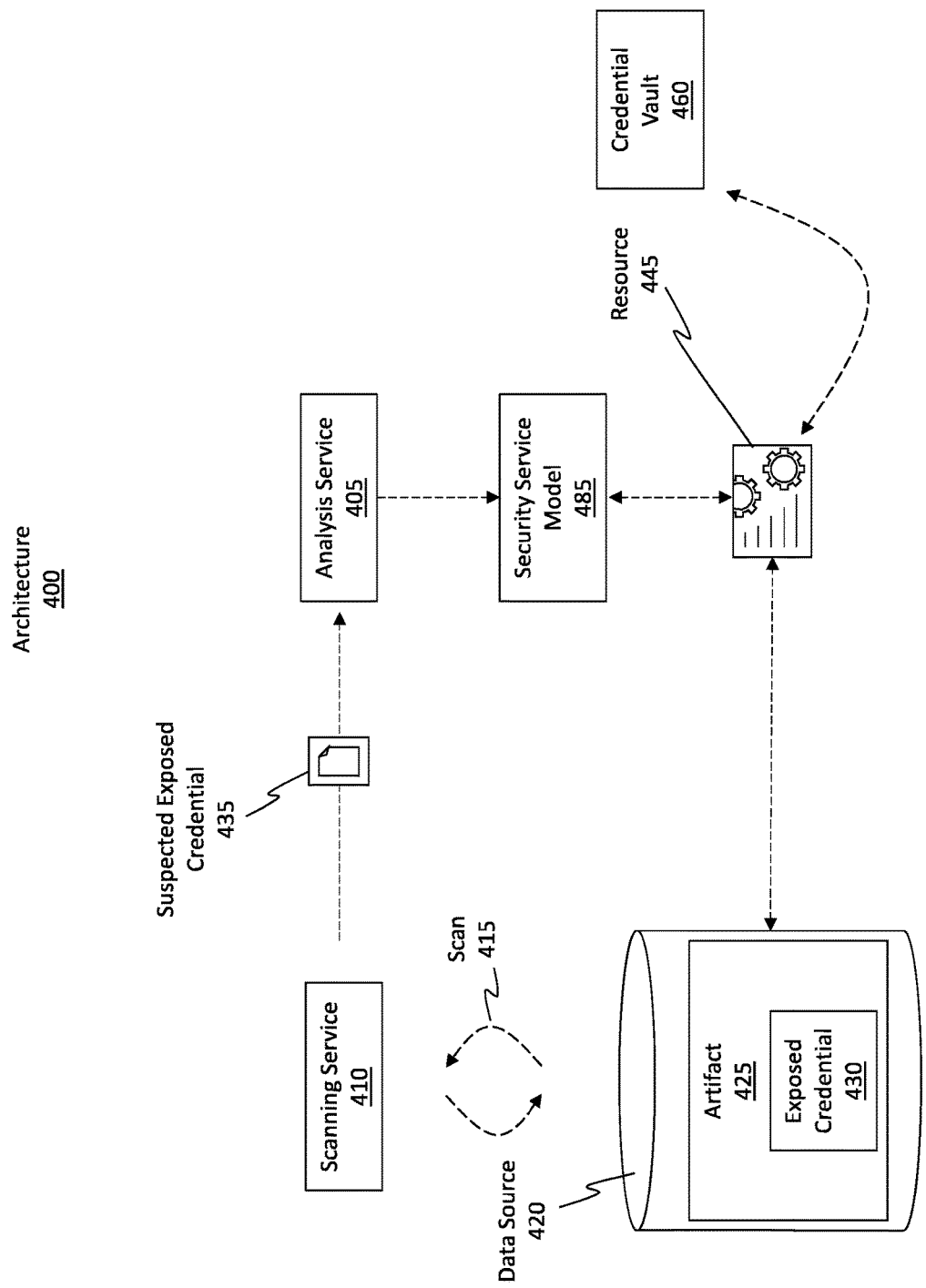

FIG. 4E shows an additional, or alternative, scenario involving the implementation of a security service model 485. The security service model 485 may be a focused model directed to manage security operations for resources under its purview.

With reference to the previous SQL example, if the resource 445 was a SQL database, then the security service model 485 might be SQL server or service specifically tasked with managing security operations for the SQL database. In such a scenario, the analysis service 405 can inform the security service model 485 about the exposed credential 430. The analysis service 405 and the security service model 485 can then operate in concert with one another to trigger the resource 445 to transition from using the exposed credential to using the new credential.

Accordingly, in some implementations, a security service model may act as an intermediate proxy between the analysis service and the resource. In some cases, the security service model is tasked with managing the resource, and the model can be alerted regarding the exposed credential.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
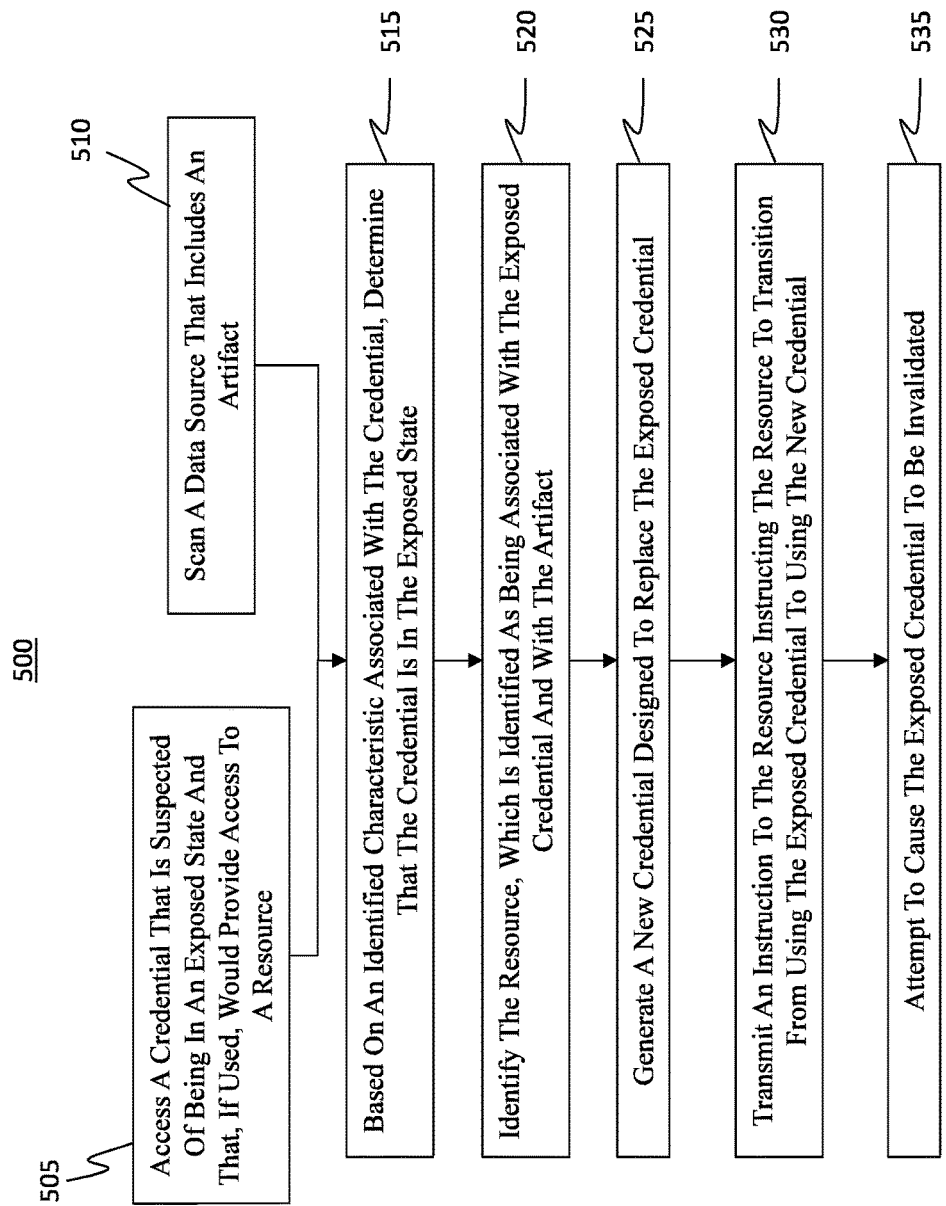
FIG. 5 illustrates a flowchart of an example method for remediating the impact of a credential being exposed.

FIG. 5 shows a flowchart of an example method 500 for identifying an exposed credential that, if used, would provide access to a resource. Performing method 500 also enables the resource to remain online while (i) a new credential is allocated for the resource, (ii) the resource is transitioned to using the new credential instead of the exposed credential, and (iii) the exposed credential is attempted to be invalidated. Method 500 can be implemented within the architecture 400 of FIGS. 4A-4E; furthermore, method 500 can be performed by the analysis service 405.

Method 500 includes an act (act 505) of accessing a credential that is suspected of being in an exposed state. Being in the "exposed state" means that the credential is accessible by entities who are not authorized to use the credential.

If this credential were used, it could provide access to a resource (e.g., a local application or a service operating in a cloud environment). Notably, it is typically the case that the credential is accessible from within an artifact (e.g., perhaps source code, a work ticket, a build definition, an email, or even a document), and the resource might operate using the artifact. In some implementations, the exposed credential is accessible from a data source that is provided public access. In some implementations, the exposed credential is at least one of: a bearer token, an identity, or a password. Among other things, the resource can also be a database administration resource, an on-premise resource, an identity, or even a certificate published by an authority.

Additionally, or alternatively, the embodiments can receive information describing the exposed credential from a third party, who might even be anonymous. By way of example, in some cases, method 500 can further include accessing reporting data that is provided by a separate entity. The reporting data provides an indication that the credential is suspected of being in the exposed state. In response to accessing and reviewing the reporting data, the method can then be triggered to access the credential, as described in act 505.

As an additional, or perhaps alternative act to act 505, act 510 includes scanning a data source that includes an artifact. The embodiments then identify, within the artifact, the exposed credential. Stated differently, in some cases, the method further includes scanning a data source that includes the artifact, which includes the exposed credential. Based on a result of the scan, the method can then be triggered to access the credential, as described in act 505.

Based on an identified characteristic associated with the credential (e.g., perhaps a pattern of the credential), act 515 includes determining that the credential is in fact a credential and further is in the exposed state and thus has been exposed. The process of determining that the credential has been exposed can include determining that the data source housing the credential is accessible by entities who do not have authorization to access the resource associated with the credential and/or do not have authorization to access the credential itself. For instance, determining that the credential is in the exposed state can include determining an access availability of a data source that is storing the credential. If the data source is publicly accessible or even accessible by entities who are not authorized to access the resource and/or the credential, then the credential will be determined to be in the exposed state. In some cases, the process of determining that the credential has been exposed can include querying either the resource or a security service model to determine whether the credential is one that could be used to access the resource.

Optionally, as indicated above, the identified characteristic associated with the credential can be a detected pattern of the credential. This detected pattern can be associated with at least one of an embedded signature in the credential or a checksum associated with the credential. In some embodiments, act 515 also includes the analysis service verifying that the credential can actually be used to access a resource. In some implementations, a machine learning algorithm or engine analyzes the identified characteristics associated with the credential to determine whether the credential is actually a resource-accessing credential (i.e. a credential that, when used, actually provides access to a resource) or is not a resource-accessing credential (i.e. a credential that, when used, does not provide access to a resource).

Act 520 includes identifying the resource, which is identified as being associated with the exposed credential and with the artifact. This identification process can occur by analyzing an environment in which the exposed credential is located and/or by analyzing the artifact in which the credential is located. In some cases, the credential itself might indicate the resource.

Act 525 includes generating a new credential designed to replace the exposed credential. In some implementations, the exposed credential and the new credential are both usable by the resource during an overlapping period of time before the exposed credential is subsequently invalidated. In some cases, the new credential is generated by the credential vault. Thus, act 525 might include an act of causing the credential vault to generate the new credential.

The embodiments can optionally monitor the resource to ensure that it remains online. This monitoring can include periodically sending a ping request (or some other request that requires a response) to the resource to query whether it is still online and active. One objective of the embodiments is to prevent the resource from having down time. As a result, the embodiments perform a soft swap of credentials. This soft swap can also be referred to as an automated rotation mechanism for invalidating and replacing credentials.

While this monitoring optionally occurs, act 530 includes transmitting an instruction to the resource. This instruction instructs the resource to transition from using the exposed credential to using the new credential. The transitioning process can include various operations. For instance, it may be the case that the resource is included in a nested chain of artifacts, where some of those artifacts are mutually reliant on one another. In such a scenario, the transitioning process can then cause not only the resource to redeploy, but the transitioning process can also cause the various other artifacts to also redeploy so as to use the new credential. In this sense, the resource can, in some scenarios, be involved with a service that consists of multiple compromised assets (e.g., tables, caches, resources, etc.) that are compromised because the resource is compromised. These assets can also be redeployed in conjunction with the redeployment of the resource.

The monitoring of the resource can optionally continue, and act 535 can include attempting to cause the exposed credential to be invalidated. Invalidating the credential can include purging the credential from the various entities that are storing the credential. In some embodiments, the exposed credential is successfully invalidated and purged. The embodiments can cause the exposed credential to be purged from the data source, from the resource, and from a credential vault. In some cases, the credential might not be purged, but it is still invalidated such that it cannot be used to access the resource. For instance, the resource and/or the credential vault can be notified that the exposed credential should no longer be considered valid. The risk associated with the exposed credential is settled when the credential is invalidated.

In some embodiments, a determination is made (e.g., perhaps by the analysis service) that the exposed credential cannot be purged without terminating the resource. For instance, this scenario may arise where the credential is hardcoded into source code, and the source code does not point to another avenue or location (e.g., the credential vault) for receiving the credential. In response to that determination, the embodiments can terminate the resource or have the resource terminated. An alert can be transmitted to an administrator of the resource informing the administrator regarding why the resource was terminated. That is, a notification can be provided to the administrator, and the notification can list a reason as to why the resource was terminated.

The alert can include various different types of information and can take various different forms. In some cases, the alert can be an email comprising descriptive information about the credential, the artifact, the conditions in which the credential was identified, and so on. The alert can also take the form of an electronic ticket or even a diagnostic that shows up in a service portal.

Some embodiments initially determine that the exposed credential cannot be purged without terminating the resource. An alert is then transmitted to a particular entity having permissions to manage the resource to inform that entity that the exposed credential cannot be purged without terminating the resource. This alert can operate as a gate or gateway for performing the actual termination. Stated differently, the embodiments can interject a manual control plane to alert the entity regarding various actions that will or can occur in an attempt to gain approval. In some cases, the embodiments terminate the resource first and then notify the responsible entity. In some cases, the embodiments notify the responsible entity and then terminate after obtaining approval or after waiting for a threshold period of time.

Accordingly, the disclosed embodiments provide significant benefits to the technical field of data storage and data security. The embodiments remove the human element from remediation efforts. The embodiments significantly reduce the number of steps that are performed for remediation. The embodiments also greatly reduce the amount of time that is spent performing the remediation.

Example Computer/Computer Systems

Figure 6:
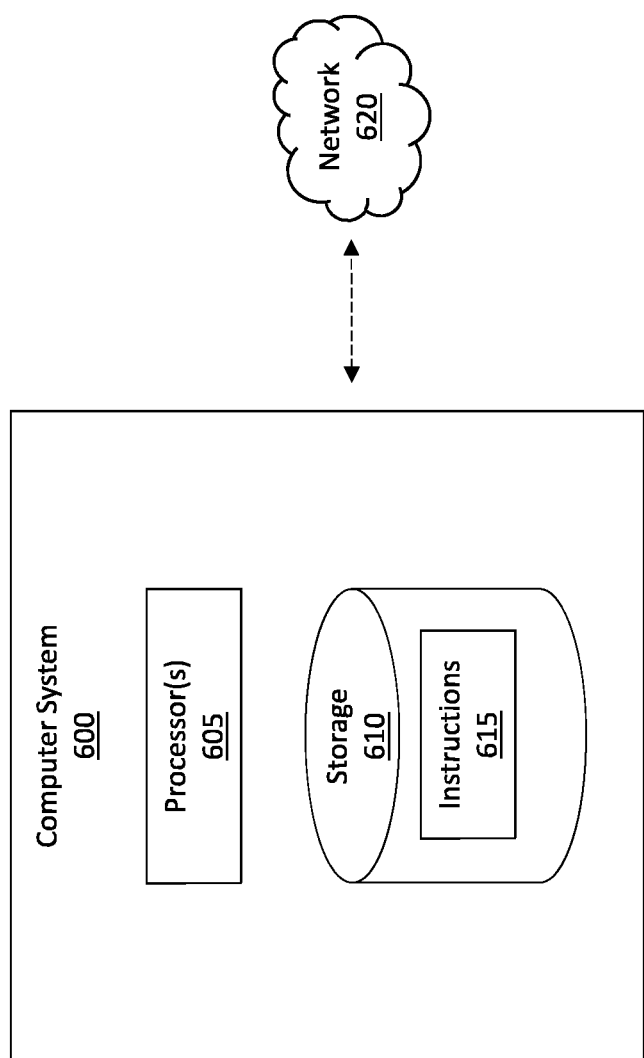
FIG. 6 illustrates an example computer system that can be configured to perform any of the disclosed operations.

Attention will now be directed to FIG. 6 which illustrates an example computer system 600 that may include and/or be used to perform any of the operations described herein. For instance, the computer system 600 can operate within the architecture 400 of FIGS. 4A-4E, and the computer system 600 can implement the analysis service 405. Computer system 600 may take various different forms. For example, computer system 600 may be embodied as a tablet, a desktop, a laptop, a mobile device, or a standalone device, such as those described throughout this disclosure. Computer system 600 may also be a distributed system that includes one or more connected computing components/devices that are in communication with computer system 600.

In its most basic configuration, computer system 600 includes various different components. FIG. 6 shows that computer system 600 includes one or more processor(s) 605 (aka a "hardware processing unit") and storage 610.

Regarding the processor(s) 605, it will be appreciated that the functionality described herein can be performed, at least in part, by one or more hardware logic components (e.g., the processor(s) 605). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 600. The different components, modules, engines, and services described herein may be implemented as objects or processors that execute on computer system 600 (e.g. as separate threads).

Storage 610 may be physical system memory, which may be volatile, non-volatile, or some combination of the two. The term "memory" may also be used herein to refer to non-volatile mass storage such as physical storage media. If computer system 600 is distributed, the processing, memory, and/or storage capability may be distributed as well.

Storage 610 is shown as including executable instructions 615. The executable instructions 615 represent instructions that are executable by the processor(s) 605 of computer system 600 to perform the disclosed operations, such as those described in the various methods.

The disclosed embodiments may comprise or utilize a special-purpose or general-purpose computer including computer hardware, such as, for example, one or more processors (such as processor(s) 605) and system memory (such as storage 610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 600 may also be connected (via a wired or wireless connection) to external sensors (e.g., one or more remote cameras) or devices via a network 620. For example, computer system 600 can communicate with any number devices or cloud services to obtain or process data. In some cases, network 620 may itself be a cloud network. Furthermore, computer system 600 may also be connected through one or more wired or wireless networks to remote/separate computer systems(s) that are configured to perform any of the processing described with regard to computer system 600.

A "network," like network 620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 600 will include one or more communication channels that are used to communicate with the network 620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for identifying an exposed credential that, if used, would provide access to a resource and for enabling the resource to remain online while (i) a new credential is allocated for the resource, (ii) the resource is transitioned to using the new credential instead of the exposed credential, and (iii) the exposed credential is attempted to be invalidated, said method comprising:
   accessing a credential that is suspected of being in an exposed state, wherein the credential is associated with a resource, and wherein the credential is accessible from within an artifact;
   based on an identified characteristic associated with the credential, determining that the credential is in the exposed state;
   identifying the resource, which is identified as being associated with the exposed credential;
   confirming whether the exposed credential is usable to access the resource;
   in response to confirming that the exposed credential is not usable to access the resource, allowing the exposed credential to continue to remain in the artifact without modification; and
   in response to confirming that the exposed credential is usable to access the resource, performing the following:
   generating a new credential designed to replace the exposed credential;
   transmitting an instruction to the resource instructing the resource to transition from using the exposed credential to using the new credential;
   triggering redeployment of the resource and the artifact with automatic application of the new credential; and
   enabling the resource to remain online while attempting to cause the exposed credential to be invalidated.

2. The method of claim 1, wherein the exposed credential is accessible from a data source that is provided public access, and wherein the exposed credential is caused to be purged from the data source.

3. The method of claim 1, wherein the identified characteristic associated with the credential is a detected pattern of the credential, the detected pattern being associated with at least one of an embedded signature in the credential or a checksum associated with the credential.

4. The method of claim 1, wherein the artifact is at least one of: a source controlled artifact, a work ticket, an automation artifact, a workflow artifact, an email, or a document.

5. The method of claim 1, wherein the exposed credential is at least one of: a bearer token, an identity, a certificate, a private key, a static credential store, a container of artifacts, compressed data, or a password.

6. The method of claim 1, wherein the method further includes transmitting an alert to an administrator, and wherein the method is performed automatically, even without a response from the administrator.

7. The method of claim 1, wherein the resource is at least one of: a local application, a service operating in a cloud environment, a database administration resource, an on-premise resource, an identity, or a certificate.

8. The method of claim 1, wherein the exposed credential and the new credential are both usable by the resource during an overlapping period of time before the exposed credential is invalidated.

9. The method of claim 1, wherein:
   a credential vault is provided,
   the credential vault maintains credentials for the resource, including the exposed credential and the new credential, and
   the exposed credential is purged from the credential vault.

10. The method of claim 1, wherein the method further includes:
    accessing reporting data that is provided by a separate entity, wherein the reporting data provides an indication that the credential is suspected of being in the exposed state; and
    in response to accessing the reporting data, performing at least one of: (i) filtering the reporting data to determine an accuracy of the reporting data, (ii) acquiring one or more artifacts pointed to by the reporting data and subjecting those one or more artifacts to review, or (iii) triggering the access of the credential.

11. The method of claim 1, wherein the method further includes:
    scanning a data source that includes the artifact, which includes the exposed credential; and
    based on a result of the scan, triggering the access of the credential.

12. The method of claim 11, wherein invalidating the exposed credential includes purging the exposed credential from at least one of the data source, the resource, or a credential vault.

13. The method of claim 12, wherein:
    a determination is made that the exposed credential cannot be purged without terminating the resource, and
    an alert is transmitted to a particular entity having permissions to manage the resource to inform said particular entity that the exposed credential cannot be purged without terminating the resource.

14. The method of claim 1, wherein a security service model, which is tasked with managing the resource, is alerted regarding the exposed credential.

15. The method of claim 1, wherein the exposed credential is successfully invalidated and purged.

16. A computer system that identifies an exposed credential that, if used, would provide access to a resource and that enables the resource to remain online while (i) a new credential is allocated for the resource, (ii) the resource is transitioned to using the new credential instead of the exposed credential, and (iii) the exposed credential is attempted to be purged, said computer system comprising:
- at least one processor; and
- at least one hardware storage device that stores instructions that are executable by the at least one processor to cause the computer system to:
  - access a credential that is suspected of being in an exposed state, wherein the credential is associated with a resource, and wherein the credential is accessible from within an artifact;
  - based on an identified characteristic associated with the credential, determine that the credential is in the exposed state;
  - identify the resource, which is identified as being associated with the exposed credential;
  - confirm whether the exposed credential is usable to access the resource;
  - in response to confirming that the exposed credential is not usable to access the resource, allow the exposed credential to continue to remain in the artifact without modification; and
  - in response to confirming that the exposed credential is usable to access the resource, perform the following:
    - generate a new credential designed to replace the exposed credential;
    - transmit an instruction to the resource instructing the resource to transition from using the exposed credential to using the new credential;
    - trigger redeployment of the resource and the artifact with automatic application of the new credential; and
    - enable the resource to remain online while attempting to cause the exposed credential to be invalidated.

17. The computer system of claim 16, wherein a machine learning algorithm analyzes the identified characteristic associated with the credential to determine whether the credential is actually a resource-accessing credential or is not a resource-accessing credential.

18. The computer system of claim 16, wherein determining that the credential is in the exposed state includes determining an access availability of a data source that is storing the credential.

19. A method for identifying an exposed credential that, if used, would provide access to a resource and for enabling the resource to remain online while (i) a new credential is allocated for the resource, (ii) the resource is transitioned to using the new credential instead of the exposed credential, and (iii) the exposed credential is attempted to be invalidated, said method comprising:
- scanning a data source that includes an artifact;
- identifying, within the artifact, a credential that is suspected of being in an exposed state, wherein the credential is associated with a resource;
- based on an identified characteristic associated with the credential, determining that the credential is in the exposed state;
- identifying the resource, which is identified as being associated with the exposed credential;
- confirming whether the exposed credential is usable to access the resource;
- in response to confirming that the exposed credential is not usable to access the resource, allowing the exposed credential to continue to remain in the artifact without modification; and
- in response to confirming that the exposed credential is usable to access the resource, performing the following:
  - generating a new credential designed to replace the exposed credential;
  - transmitting an instruction to the resource instructing the resource to transition from using the exposed credential to using the new credential;
  - triggering redeployment of the resource and the artifact with automatic application of the new credential; and
  - enabling the resource to remain online while attempting to cause the exposed credential to be invalidated.

20. The method of claim 19, wherein the data source is one whose access availability does not satisfy a restricted access threshold.

* * * * *